UNITED STATES PATENT OFFICE.

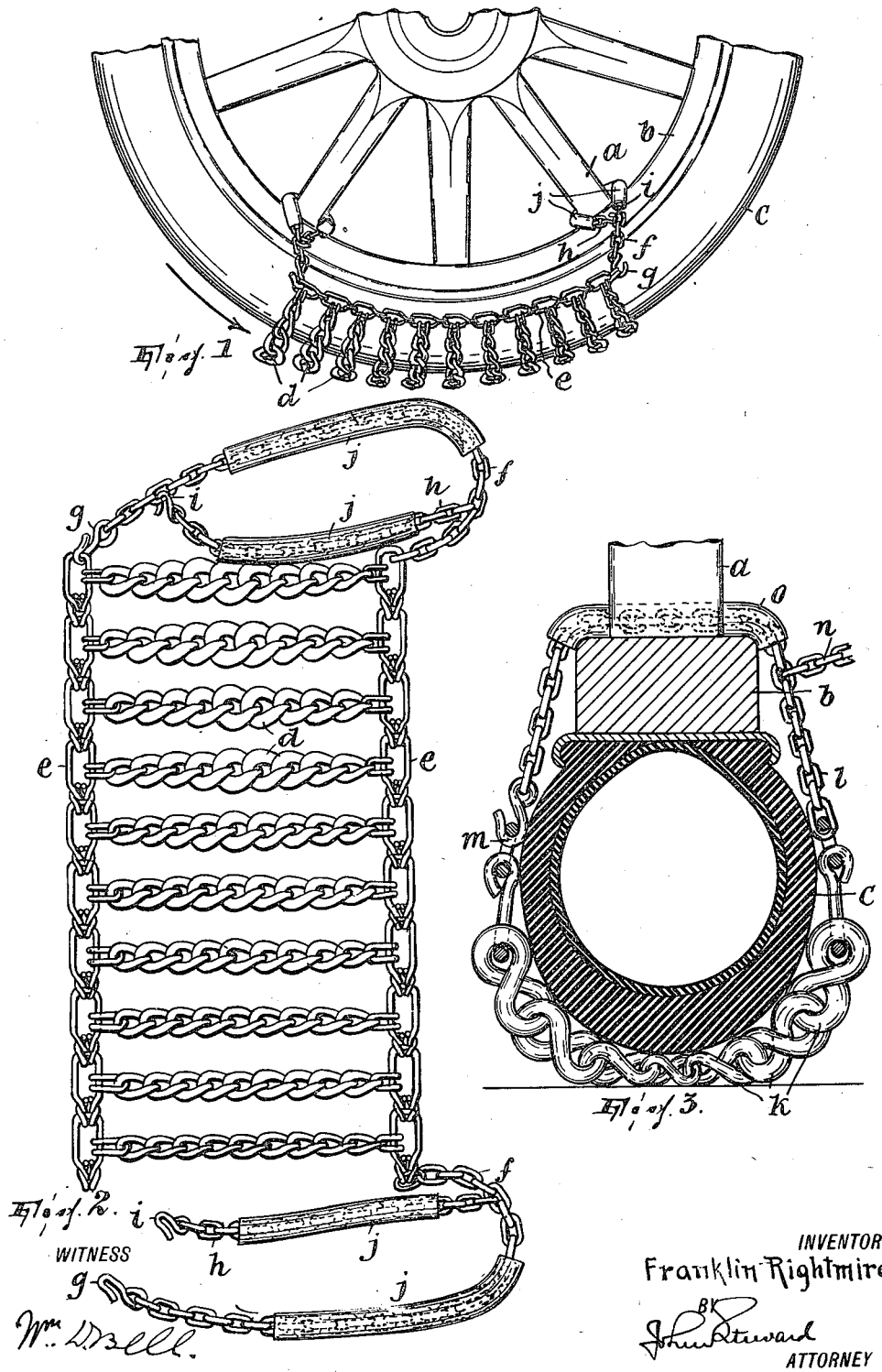

FRANKLIN RIGHTMIRE, OF PATERSON, NEW JERSEY.

TRACTION ATTACHMENT FOR VEHICLE DRIVING-WHEELS.

1,301,078.　　　　　　　　Specification of Letters Patent.　　　Patented Apr. 15, 1919.

Application filed June 6, 1918. Serial No. 238,555.

*To all whom it may concern:*

Be it known that I, FRANKLIN RIGHTMIRE, a citizen of the United States, residing at Paterson, in the county of Passaic and State of New Jersey, have invented certain new and useful Improvements in Traction Attachments for Vehicle Driving-Wheels, of which the following is a specification.

This invention relates to traction attachments for vehicle wheels, and it consists in a novel traction attachment in which the portion thereof which actually has contact with the ground is graduated in thickness for certain purposes, to be pointed out, according to the service to which the attachment is to be put.

In the accompanying drawings,

Figure 1 is a fragmentary side view of a wheel and one form of the improved traction attachment attached to the wheel;

Fig. 2 is a plan of said attachment detached; and

Fig. 3 is a transverse sectional view of the circumferential portion of a spoked wheel, showing attached thereto another form of the traction attachment.

In the drawings, the wheel shown is of the spoked type, $a$ being the spokes, $b$ the felly and $c$ the tire.

The attachment shown in Figs. 1 and 2 is composed of a series of transverse chain lengths or members $d$ preferably arranged parallel and two longitudinal chain lengths or members $e$ which are connected by the lengths or members $d$. The members $d$ are preferably, though not indispensably so closely arranged that, when the attachment is applied to the wheel as shown in Fig. 1, if the tire itself may have contact with the ground between the members $d$ it will do so without appreciable tractive effort, and in any case so that two or more of the transverse lengths will always be in contact with the ground. This mat attachment is only adapted to reach around a limited portion of the tire $c$, since it is intended only to be used in such an emergency as when a driving wheel sinks into a soft slippery piece of ground in which the bare tire slips when driven by the engine so that the vehicle cannot be started. For lashing it to the wheel, it being then arranged with the side members $e$ extending along the opposite sides of the circumferential portion $b$ $c$ of the wheel and the members $d$ extending transversely of the tread thereof, I provide the attaching chain members $f$ each of which may be permanently attached to the end of one of the side members $e$ and have a hook $g$ whereby to secure it to the corresponding end of the other side member $e$. The members $f$ are intended to be passed across the inner side of the rim $b$ and bear against relatively opposite sides of two of the spokes $a$, and each may have a branch chain $h$ secured at one end thereof and provided with a hook $i$ to engage therewith, the chain $f$ and branch chain $h$ being intended to embrace a spoke as shown in Fig. 1. Each chain and branch chain may be equipped with a piece of rubber tubing $j$ or equivalent, which it penetrates and which serves to prevent the chain from chafing the spoke and rim $b$. The series of lengths or members $d$ is graduated in size so that the chain at one end of the series is the smallest and that at the other is the largest or thickest, at least at the tread portion thereof, and the device is attached to the wheel so that assuming that the wheel is to be driven in the direction of the arrow in Fig. 1 the increase in thickness of the members $d$ proceeds in the opposite direction. The object of this construction is to obtain a progressively increasing tractive effort of the attachment, as when it is applied to a wheel that has sunk in a soft piece of ground in which otherwise the wheel would rotate without tractive effort sufficient to move the vehicle.

In Fig. 3, the essential feature is a series of transverse flexible members graduated in size lengthwise, to wit, transversely of the wheel, with the smallest gage thereof coincident with the central tread line of the wheel. This feature is applicable to any chain or equivalent traction attachment for vehicle driving wheels, whether the same extends clear around the wheel or partway around the same, as in the case of the mat shown in Figs. 1 and 2. The object is to extend the tractive effect transversely of the wheel. One of the transverse members of such an attachment is shown in Fig. 3 as consisting of a series of links $k$ which are graduated in size so that the smallest link is coincident with the center of the wheel tread and the two largest links are at the extreme right and left of the tread. The series of links is secured to the wheel in substantially the same manner as the mat shown in Figs. 1 and 2 is secured thereto, to wit, by a chain or equivalent flexible member $l$ attached to the series of links *k* at one side of the wheel and having a hook and eye connection *m* at the other side thereof; the chain *l* may have a branch chain *n* to be detachably hooked at its free end to the chain *l* (so that *l* and *n* will embrace a spoke), and the two chains *l* and *n* may be equipped with rubber tubing *o* to prevent chafing the felly and spoke.

Having thus fully described my invention, what I claim as new and desire to secure by Letters Patent is:—

1. A traction attachment for a vehicle driving wheel including a flexibly connected series of members having means to secure it to the wheel with said members in contact with the tread face of the wheel, said members increasing in thickness one after another.

2. A flexible traction attachment for a vehicle driving wheel including a transverse traction element graduated in thickness and means to secure said element across the tread part of the wheel with its least thickness substantially coincident with the center line of the wheel tread.

3. A traction attachment for vehicle driving wheels including a traction chain graduated in thickness and means to secure the chain across the tread part of the wheel with its least thickness substantially coincident with the center line of the tread.

4. A traction attachment for a vehicle driving wheel including a transverse traction element formed gradually thicker from an intermediate point toward both ends thereof, and means to secure said element across the tread part of the wheel with its portion of least thickness substantially coincident with the center line of the wheel tread.

5. A traction attachment for a vehicle driving wheel including a plurality of transverse traction elements each formed gradually thicker from an intermediate point toward both ends thereof and means to connect said elements flexibly together, in combination with means to secure said attachment to the wheel with said elements extending across the wheel tread and with the least thickness of each of them substantially coincident with the center line of the tread.

In testimony whereof I affix my signature.

FRANKLIN RIGHTMIRE.